United States Patent Office 3,340,457
Patented Sept. 5, 1967

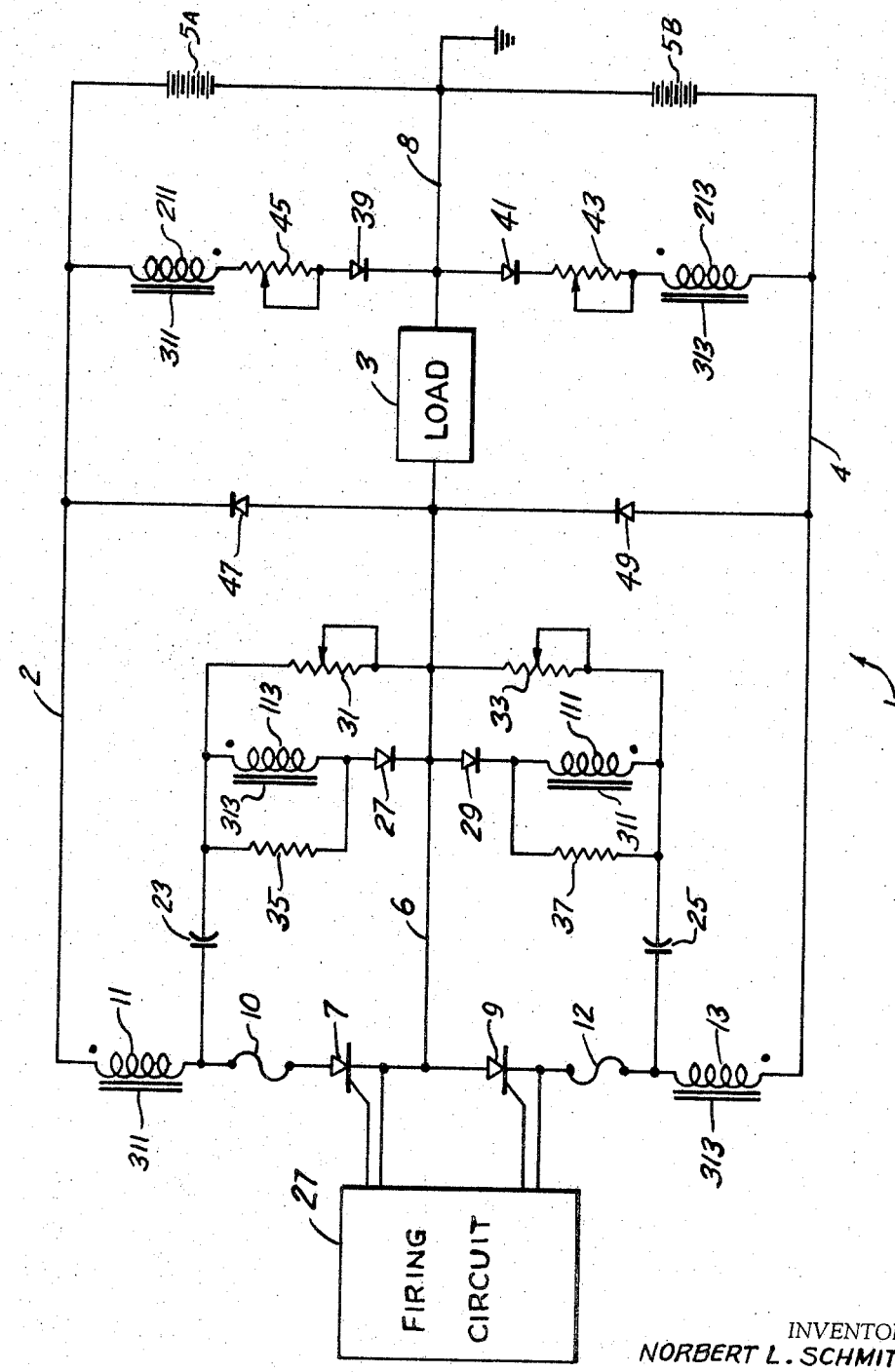

3,340,457
STATIC INVERTER CIRCUIT
Norbert L. Schmitz, Waunakee, Wis., assignor to Louis Allis Company, Milwaukee, Wis., a corporation of Wisconsin
Filed Nov. 24, 1964, Ser. No. 413,459
5 Claims. (Cl. 321—45)

This invention relates to inverter circuitry for changing direct current to alternating current by means of electronic elements or devices and more particularly to inverter circuitry containing means for controlling the electronic devices to insure reliable operation of the circuitry.

Inverter circuits generally employ controlled rectifiers; that is unidirectional current conducting devices whose period of conduction may be controlled as the electronic elements for changing the direct current input to an alternating current output. These rectifier elements may be gas filled tubes, such as thyratrons, or semi-conductor controlled rectifiers. The inverter circuit controls the conducting state and conduction interval of the controlled rectifiers in the inverter circuit to determine the direction and magnitude of the alternating current output.

Satisfactory inverter circuit operation requires that the conduction states in intervals of the controlled rectifiers be positively and reliably controlled. The repetitive, cyclical operation of the inverter circuit necessary to produce an alternating current output additionally demands that the inverter circuit maintain continuing control over the controlled rectifiers. Improper control of the rectifier elements results in an unusable alternating current output and the possibility of destruction or damage to the inverter circuitry.

Control over the conduction state and interval of a controlled rectifier is accomplished by signals applied to the three electrodes of the controlled rectifiers. Both gas filled tube and semi-conductor controlled rectifiers have a positive electrode or anode and a negative electrode or cathode. In the former the third electrode is termed the grid and is used to initiate the conducting state in the rectifier; in the latter, it is termed the gate and is similarly utilized.

Initiating the conducting state of a controlled rectifier generally presents few control problems in the design and operation of inverter circuitry. The anode and cathode electrodes of the rectifier are biased in a manner conducive to conduction; and a small signal, both in magnitude and duration, applied to the gate or grid electrode is sufficient to trigger or fire the controlled rectifier into the conducting state. Controlled rectifiers exhibit the characteristic that, once the conduction state is initiated by the gate or grid electrode, the electrode looses all influence over conditions existing in the rectifier and the rectifier remains in the conducting state as long as the anode and cathode electrodes continue to be properly biased.

To terminate the conducting state of a controlled rectifier the anode and cathode electrodes must be reverse-biased by the signals applied thereto to stop current flow through the rectifier. Larger signals are required to terminate the conducting state of a rectifier than to initiate that state, as the turn-off signals are applied to the anode and cathode, rather than the gate, electrodes. The signals must also be applied for a longer period of time to insure that current through the rectifier has ceased and conduction terminated. The provision of a satisfactory means for controlling the conducting state and interval of controlled rectifiers and in particular for controlling the termination of the conducting state has proven most critical in the design of inverter circuitry.

Prior art attempts to provide a means for terminating the conducting state of the controlled rectifiers in inverter circuitry have generally employed a storage means, such as a capacitor, in the inverter circuit to store energy while a controlled rectifier is in the conducting state. The stored energy is released, when it is desired to terminate conduction in the rectifier, to reverse-bias the rectifier. However, the possibility that the storage means may fail to store a sufficient amount of energy or may discharge its stored energy too rapidly to insure termination of the conducting state of the rectifier has prevented inverter circuits employing storage means for controlled rectifier turn-off from attaining a high degree of reliability. The above failings are rendered more acute if the inverter circuit is to be operated over a range of output alternating current frequencies or input voltages. Operation at low voltages or high frequencies may prevent the storage means from storing and releasing sufficient amounts of energy for satisfactory rectifier control.

It is, therefore, an object of this invention to provide inverter circuitry containing improved means for controlling the conducting state and interval of electronic elements contained therein to secure reliable operation of the inverter circuitry.

It is another object of this invention to provide inverter circuitry containing a positive, active means, rather than a passive or storage means, to control the conduction state and interval of controlled rectifiers contained in the inverter circuit.

A further object of this invention is to provide inverter circuitry which is capable of reliable operation over a wide range of frequencies and voltages.

Briefly, the inverter circuitry described and claimed in this patent comprises at least a pair of controlled rectifiers connected in series across a direct current source. The output circuit of the inverter is connected intermediate the series connected rectifiers and the direct current source, and is provided with alternating current by turning on and off first one and then the other series connected rectifier. The inverter circuit contains two saturable transformers, each having a primary winding connected in series with one of the controlled rectifiers. The associated secondary winding of each transformer is connected to the other rectifier of the series connected pair in a manner to provide a turn-off signal to that rectifier when the transformer primary winding is energized. Thus, as the controlled rectifiers are sequentially turned on by firing signals applied to the gate electrodes, when one rectifier of the series pair is turned on to conduct power to the load, the transformer primary winding associated therewith is energized by the same power. This primary winding supplies power to its secondary winding to produce a turn-off signal to the other rectifier of the pair. This signal is applied for a sufficiently long period of time to force that rectifier into the non-conducting state and retain it in that state. A similar action takes place on the turn-on of a subsequent rectifier; that is, the turn-on of the subsequent controlled rectifier and the conduction of power through it and the associated transformer primary winding forces turn-off of the preceding rectifier by back-biasing signals from the transformer secondary winding connected thereto. The positive application of back-biasing turn-off signals from the direct current source to the controlled rectifiers through transformers, rather than by indirectly storing power from the direct current source in a storage means and releasing it to terminate the conducting state of the controlled rectifiers as done in the prior art, forms a salient feature of this invention.

The invention, both as to its organization and method of operation, taken with further objects and advantages thereof, will be best understood by reference to the following description taken in conjunction with the accompanying drawing, which shows an inverter circuit constructed in accordance with the present invention.

In the drawing, the numeral 1 indicates a static inverter for supplying alternating current to load 3 from a direct current source, shown illustratively as batteries 5A and 5B. Batteries 5A and 5B supply power to a positive direct current bus 2 and a negative direct current bus 4. Controlled rectifiers 7 and 9, protected by fuses 10 and 12, are connected in series across the positive and negative direct current buses 2 and 4. While these controlled rectifiers may be of any type, they are shown as the semiconductor type in the drawing. The load circuit containing load 3 is connected intermediate controlled rectifiers 7 and 9 and batteries 5A and 5B by conductors 6 and 8.

Static inverter 1 contains two transformers. Each transformer consists of a primary winding, a secondary winding, and a reset winding mounted on a common core. This common core may be of a toroidal, gapless construction. The first of these transformers consists of core 311, primary winding 11, secondary winding 111, and reset winding 211. The second transformer consists of core 313, primary winding 13, secondary winding 113, and reset winding 213. Primary winding 11 is connected in series with controlled rectifier 7. The associated secondary winding 111 is connected in parallel with controlled rectifier 9. The reset winding 211 is connected across battery 5A and in series with rheostat 45 and diode 39. Primary winding 13 is connected in series with controlled rectifier 9. The associated secondary winding 113 is connected in parallel across controlled rectifier 7. The reset winding 213 is connected across battery 5B and in series with rheostat 43 and diode 41. The secondary windings 111 and 113 have a fewer number of turns than primary windings 11 and 13.

Transformer secondary windings 111 and 113 are connected in series with diodes 29 and 27, respectively; and in parallel with resistors 33 and 37, and 31 and 35, respectively. Capacitor 23 is connected in the parallel circuit of controlled rectifier 7 and secondary winding 113. Capacitor 25 is connected in the parallel circuit of controlled rectifier 9 and secondary winding 111. Diode 47 is connected between positive direct current bus 2 and conductor 6, while diode 49 is connected between negative direct current bus 4 and conductor 6.

Inverter circuit 1 provides alternating current through load 3 from direct current supply 5A and 5B by alternately rendering controlled rectifiers 7 and 9 conductive by a firing signal applied to the gate of the controlled rectifiers from firing circuit 27. Current flows alternately in the clockwise direction through positive direct current bus 2, controlled rectifier 7, conductor 6, load 3, and conductor 8 when controlled rectifier 7 is in the conducting state, providing a reversing or alternating current through load 3.

As each controlled rectifier is rendered conductive by firing circuit 27, it is necessary that the other rectifier of the pair be turned off, to provide the alternating current to load 3 and to prevent a line-to-line short between positive bus 2 and negative bus 4 from actuating protective fuses 10 and 12 or damaging controlled rectifiers 7 and 9. The manner in which controlled rectifier turn-off is provided by the circuitry of static inverter 1 may be understood by an analysis of inverter circuit 1 through a cycle of operation wherein controlled rectifier 7 is on and conducting power to load 3 and it is desired to turn off rectifier 7 and turn on rectifier 9 to reverse the power through load 3.

With controlled rectifier 7 conducting, current through primary winding 11 saturates the first transformer. Capacitor 23 will be discharged through a path consisting of controlled rectifier 7, conductor 6, and resistor 31. The second transformer is reset from any previous operations by a current from battery 5 through diode 41, rheostat 43, and reset winding 213. Rheostat 43 provides for an adjustment of the resetting current through reset winding 213. Diode 27 prevents capacitor 23 from discharging through secondary winding 113 and interfering with the resetting action. Capacitor 25 is charged to the potential difference between positive direct current bus 2 and negative direct current bus 4, less the small voltage drops across saturated primary winding 11, controlled rectifier 7, diode 29, and saturated secondary winding 111.

To initiate the turn-off of controlled rectifier 7, controlled rectifier 9 is turned on by firing circuit 27. Since transformer primary winding 11 is saturated and controlled rectifier 7 is in the conducting state, the turn-on of controlled rectifier 9 connects primary winding 13 across positive bus 2 and negative bus 4. The initial current through controlled rectifier 9 and transformer primary winding 13 is limited to a safe value by the inductance of primary winding 13. The inductance of this winding is such that primary winding 13 does not reach the saturated state until after a sufficient time interval to allow inverter circuit 1 to turn off controlled rectifier 7. This prevents a full line-to-line short across controlled rectifiers 7 and 9. Capacitor 25 discharges through the controlled rectifier 9, resistor 33, and conductor 6.

The passage of current through transformer primary winding 13 produces a positive potential at the unmarked or upper terminal of primary winding 13, as shown in the drawing and induces a current in transformer secondary winding 113. The unmarked or lower terminal of secondary winding 113 assumes the positive potential. This induced current diverts the load current away from controlled rectifier 7 through capacitor 23, transformer secondary winding 113 and diode 27 to load 3, turning off controlled rectifier 7. This is caused by the excess of current in secondary winding 113 over that in primary winding 13 occasioned by the magnetomotive force being constrained to zero by the toroidal, gapless construction to transformer core 313 and by the greater number of turns in primary winding 13 over secondary winding 113. Some of the excess current in transformer secondary winding 113 is applied to controlled rectifier 7 as a sweepout current which back-biases controlled rectifier 7 and insures its turn-off. The first transformer is removed from the saturated state by the turn-off of controlled rectifier 7. Any inductive energy produced in the secondary winding 111 is dissipated in resistor 37, protecting rectifier 29 against excessive reverse voltges. After the turn-off controlled rectifier 7, capacitor 23 continues to be charged by a current induced in transformer secondary winding 113 through a path comprised of conductor 6, diode 47, positive D.C. conductor 2, and transformer primary winding 11. Capacitor 23 charges through this path until the voltage across it equals the voltage across transformer secondary winding 113 by the current induced therein.

When controlled rectifier 7 turns off, the current through the load is free to reverse in a manner determined by the type of load 3. As the second transformer becomes saturated, reducing the voltage across transformer primary winding 13, the full voltage of battery 5B is applied to the load. When the current reverses in load 3, the left end of load 3 as shown in the drawing assumes a negative potential equal to that of battery 5B. Capacitor 23 then charges to nearly the full potential difference of batteries 5A and 5B through saturated secondary winding 113.

The attainment of full charge on capacitor 23 causes a cessation of current through secondary winding 113. It also causes the current through transformer primary winding 11 to cease, and the first transformer is no longer held in the saturated state. Battery 5A provides a reset current into the unmarked or upper terminal of reset winding 211, resetting the first transformer. The counter reset current produced in secondary winding 111 by current flow in reset winding 211 is circulated through resistor 37. Diode 29 prevents the discharge current from capacitor 25 from circulating through secondary winding 111, permitting a fast reset of the first transformer. This completes one cycle of operation of inverter circuitry 1.

The succeeding cycle of operation is similar, but involves the opposite components of the previously described cycle of operation. To initiate the subsequent cycle, controlled rectifier 7 is turned on by firing circuit 27. Current from battery 5A flows through transformer primary winding 11 and controlled rectifier 7. The current flow in primary winding 11 induces a current flow in the associated transformer secondary winding 111. This diverts the load current from controlled rectifier 9 and also provides a back-biasing turn-off current thereto. Capacitor 23 is discharged through controlled rectifier 7 and resistor 31, while capacitor 25 is charged by a current through transformer secondary winding 111. Subsequent to the turn-off of controlled rectifier 9 and the accompanying reversal of polarity of the load, capacitor 25 continues to be charged by the current from secondary winding 111 through a path consisting of capacitor 25, primary winding 13, negative direct current bus 4, diode 49, conductor 6, and diode 29. As primary winding 11 reaches saturation, the full voltage of battery 5A is applied to load 3. Capacitor 25 is fully charged to the potential of batteries 5A and 5B through diode 29 and secondary winding 111, stopping current flow in secondary winding 111. Current from battery 5B through reset winding 213 acts to reset the second transformer.

From the foregoing description, taken together with the accompanying drawing, it will be apparent that this invention provides for inverter circuitry containing an efficient, reliable means for controlling the operation of electronic elements employed by the inverter circuitry to change the direct current input to an alternating current output.

In the drawing and the specification there has been set forth a preferred embodiment of the invention; and although specific terms are employed, they are used in a generic and descriptive sense only, and not for the purposes of limitation. Changes in form or other embodiments such as multiple phase inverter circuitry, as well as the substitution of equivalents, are contemplated as circumstances may suggest or render expedient, without departing from the spirit or scope of this invention as defined in the following claims.

What is claimed is:
1. An inverter circuit comprising:
  (1) a direct current power supply;
  (2) at least first and second controlled rectifiers connected in series across said power supply;
  (3) an alternating current load circuit connected intermediate the first and second controlled rectifiers and the power supply;
  (4) means for alternately turning on said rectifiers; and
  (5) means for turning off said rectifiers comprising:
    (a) a first transformer having a core, a primary winding, a secondary winding, and a reset winding, said primary winding connected in series with the first of said controlled rectifiers and energized by the power supply when the first controlled rectifier is turned on, said secondary winding connected to the second of said controlled rectifiers to generate a turn-off signal to said second controlled rectifier when said primary winding is energized, said reset winding connected across the power supply to reset said transformer when the primary winding ceases to be energized,
    (b) a second transformer having a core, a primary winding, a secondary winding, and a reset winding, said primary winding connected in series with the second of said controlled rectifiers and energized by the power supply when the second controlled rectifier is turned on, said secondary winding connected to the first of said controlled rectifiers to generate a turn-off signal to said first controlled rectifier when said primary winding is energized, said reset winding connected across the power supply to reset said transformer when the primary winding ceases to be energized,
    (c) means connected to said secondary windings to terminate the turn-off signal after a sufficient time interval to turn off the controlled rectifiers; whereby said first and second controlled rectifiers are alternately turned on and off to provide an alternating current to the load circuit.

2. The inverter circuit of claim 1 wherein the means connected to said secondary windings to terminate the turn-off signal after a sufficient time interval to turn off the controlled rectifiers comprises:
  (1) a capacitive means connected to each of said secondary windings of said first and second transformers;
  (2) means to discharge said capacitive means when the controlled rectifier associated with the respective secondary winding is turned on; and
  (3) means to charge said capacitor when a turn-off signal is provided to the controlled rectifier associated with the respective secondary winding; said capacitive means terminating said turn-off signal when charged.

3. The inverter circuit of claim 1 wherein said transformer cores in said first and second transformers are of toroidal, gapless construction and wherein said primary windings have a greater number of turns than said secondary windings.

4. An inverter circuit comprising:
  (1) a direct current power supply;
  (2) at least first and second controlled rectifiers connected in series across said power supply;
  (3) an alternating current load circuit connected intermediate the first and second controlled rectifiers and the power supply;
  (4) means for alternately turning on said rectifiers; and
  (5) means for turning off said rectifiers comprising:
    (a) a first transformer having a core, a primary winding, a secondary winding, and a reset winding, said primary winding connected in series with the first of said controlled rectifiers and energized by the power supply when the first controlled rectifier is turned on, said secondary winding connected to the second of the controlled rectifiers to generate a turn-off signal to said second controlled rectifier when said primary winding is energized, said reset winding connected across the power supply to reset said transformer when the primary winding ceases to be energized, means connected to said reset winding to control the resetting action thereof, said secondary winding provided with means for dissipating the counter-reset currents generated therein,
    (b) a second transformer having a core, a primary winding, a secondary winding, and a reset winding, said primary winding connected in series with the second of said controlled rectifiers and energized by the power supply when the second controlled rectifier is turned on, said secondary winding connected to the first of said controlled rectifiers to generate a turn-off signal to said first controlled rectifier when said primary winding is energized, said reset winding connected across the power supply to reset said transformer when the primary winding ceases to be energized, means connected to said reset winding to control the resetting action thereof, said secondary winding provided with means for dissipating the counter-reset current generated therein,
    (c) capacitive means connected to each of said secondary windings of said first and second transformers, (d) means to discharge said capacitive means when the controlled rectifier associated with the respective secondary winding is turned on, (e) means to charge said capacitive means when a turn-off signal is provided to the controlled rectifier associated with the respective secondary winding, said capacitive means terminating said turn-off signal when charged;

whereby said first and second controlled rectifiers are alternately turned on and off to provide an alternating current to the load circuit.

5. An inverter circuit comprising:
(1) a direct current power supply;
(2) at least first and second controlled rectifiers connected in series across said power supply;
(3) an alternating current load circuit connected intermediate the first and second controlled rectifiers and the power supply;
(4) means for alternately turning on said rectifiers; and
(5) means for turning off said rectifiers comprising:
 (a) a first transformer having a core, a primary winding, and a secondary winding, said primary winding connected in series with the first of said controlled rectifiers and energized by the power supply when the first controlled rectifier is turned on, said secondary winding connected to the second of said controlled rectifiers to generate a turn-off signal to said second controlled rectifier when said primary winding is energized,
 (b) a second transformer having a core, a primary winding, and a secondary winding, said primary winding connected in series with the second of said controlled rectifiers and energized by the power supply when the second controlled rectifier is turned on, said secondary winding connected to the first of said controlled rectifiers to generate a turn-off signal to said first controlled rectifier when said primary winding is energized,
 (c) means connected to said secondary windings to terminate the turn-off signal after a sufficient time interval to turn off the controlled rectifiers;

whereby said first and second controlled rectifiers are alternately turned on and off to provide an alternating current to the load circuit.

References Cited

UNITED STATES PATENTS

| | | | |
|---|---|---|---|
| 3,131,343 | 4/1964 | Reinert | 321—16 |
| 3,197,691 | 7/1965 | Gilbert | 321—25 X |
| 3,263,152 | 7/1966 | Walker | 321—45 |
| 3,286,155 | 11/1966 | Corey | 321—45 |
| 3,308,372 | 3/1967 | Young et al. | 321—45 |

JOHN F. COUCH, *Primary Examiner.*

W. M. SHOOP, *Assistant Examiner.*